United States Patent [19]

Schmit

[11] 3,815,151

[45] June 4, 1974

[54] OPTICAL MEMORY WITH READOUT BEAM ANNEAL

[75] Inventor: Francis M. Schmit, St. Louis Park, Minn.

[73] Assignee: Honeywell Inc., Minneapolis, Minn.

[22] Filed: July 9, 1973

[21] Appl. No.: 377,466

[52] U.S. Cl. .................................. 360/114, 360/59

[51] Int. Cl. .............................................. G11b 7/00

[58] Field of Search............340/174.1 H, 174.1 M, 340/174 YC

[56] References Cited

UNITED STATES PATENTS

| | | | |
|---|---|---|---|
| 3,626,114 | 12/1971 | Lewicki | 340/174.1 M |
| 3,631,415 | 12/1971 | Aagarb | 340/174.1 M |
| 3,715,740 | 2/1973 | Schmit | 340/174.1 M |

*Primary Examiner*—Vincent P. Canney
*Attorney, Agent, or Firm*—Lamont B. Koontz; David R. Fairbairn

[57] ABSTRACT

Information is stored on a manganese bismith film having low and high temperature crystallographic phases. Greatly reduced readout signal level variation due to crystallographic phase changes is achieved by magneto-optically reading out information with a light beam having an intensity sufficient to temporarily heat a bit to a temperature at which at least a portion of the high temperature phase in the bit is removed by transformation back to the low temperature phase. The readout beam does not, however, have an intensity sufficient to heat the bit to a temperature above the low temperature phase Curie temperature.

7 Claims, 2 Drawing Figures

OPTICAL MEMORY WITH READOUT BEAM ANNEAL

BACKGROUND OF THE INVENTION

The present invention relates to a system for storing information. In particular, the present invention relates to a method and system for optically storing information on a magnetic film having a plurality of temperature dependent crystallographic phases.

For purposes of this application, a magnetic medium is any ferromagnetic or ferrimagnetic material having two or more temperature dependent crystallographic phases. The Curie point associated with the magnetic medium is that temperature at which the material loses its magnetization. While the present invention includes all magnetic media having a plurality of temperature dependent crystallographic phases, for purposes of convenience, the discussion is limited primarily to maganese bismuth.

The continuing need for increased data storage capacity in modern information systems has required the development of new technologies for mass data storage. Laser accessed optical memories offer a significant increase in bit packing density, and hence capacity, over conventional magnetic recording techniques.

One highly advantageous optical information storage scheme utilizes a laser to provide Curie point writing. Such a system was disclosed and claimed in U.S. Pat. No. 3,368,209 to L. D. McGlauchlin et al., which is assigned to the same assignee as the present invention. Although many ferromagnetic films may be used as a memory medium for a Curie point type optical mass memory, thin films of manganese bismuth (MnBi) have been found to be as a most attractive memory medium. MnBi films exhibit an unusually large magneto-optic rotation and a preferred magnetization direction which is oriented normal to the plane of the film. Reproducible, large area thin films of MnBi having substantially uniform magnetic properties over the entire area of the film may be formed by the process described by D. Chen et al. in U.S. Pat. No. 3,539,383, which is assigned to the same assignee as this application.

While manganese bismuth film has many advantages as a thermomagnetic memory medium, it does have some disadvantages. In particular, it has been discovered that the thermal cycling required to write and erase information by the Curie point method on MnBi film causes a gradual shift of the readout signal levels. This shift in signal levels could cause a reduction in the margin for detection.

The shift in signal levels in MnBi film is the result of a crystallographic phase change. The intermetallic compound MnBi possesses two crystallographic phases. At temperatures below 360°C, MnBi is ferromagnetic with a nickel arsenide type hexagonal crystal structure. Above 360°C, a first order phase transition takes place and the compound becomes paramagnetic with a high temperature crystallographic structure. Upon quenching back to room temperature, the high temperature structure can be frozen in. The resultant compound is again ferromagnetic but with a reduced Curie temperature of about 180°C. This "quenched high temperature" phase MnBi exhibits a magneto-optic rotation which is less than the magneto-optic rotation of "normal" or "low temperature" phase MnBi.

Curie point writing on normal phase MnBi films requires heating of a spot to a temperature above 360°C, the normal phase Curie temperature. The magnetization vector of the heated spot after cooling is determined by the combined influence of the demagnetizing field from the surrounding unheated regions and any external applied magnetic field. As described by D. Chen and R. L. Aagard in "MnBi Films: High-Temperature Phase Properties and Curie-Point Writing Characteristics", *Journal of Applied Physics*, 41, 2530 (1970), a one micron diameter spot on MnBi film of 500 A. thickness can be heated from room temperature to 360°C in a microsecond. Upon termination of the laser power, the heated spot cools back to room temperature within a few microseconds. The rapid cooling process is similar to quenching the written spot. As a result, the thermal cycling required to write and erase information by the Curie point method on MnBi film causes a gradual transformation fron one crystallographic phase to the other phase. As a written spot gradually transforms from one crystallographic phase to another with repeated thermal cycling, the magnitude of the magneto-optic effect exhibited by the spot gradually changes, thereby causing a change in the readout signal level.

Several techniques for eliminating or compensating for the crystallographic phase change in manganese bismuth have been proposed. While each of these techniques is effective in minimizing the crystallographic phase change problem, each technique also has a specific disadvantage such as increased system complexity, reduced packing density, or reduced readout signal-to-noise ratio.

In U.S. Pat. No. 3,631,415 by R. L. Aagard, D. Chen, and F. M. Schmit, the crystallographic phase change in MnBi films is completely eliminated by operating the film within a temperature range during the quiescent stage of operation in which only the normal phase exists. This requires operation at temperatures over 180°C but less than about 3360°C. In many optical memory systems, the memory medium is on a rotating disk. One advantageous feature of the disk type optical memory is that one disk can be removed and another put in its place to provide additional storage capacity. When an optical memory is operating with the disk heated about 200°C, however, the entire system must be allowed to cool down before the disks can be changed. The system must then heat back up to the quiescent temperature of over 200°C before operation can begin again. This causes prolonged periods when the memory is not in operation. For this reason, the preferred optical memory with a manganese bismuth film for the memory medium operates at room temperature rather than at an elevated temperature.

Another technique for overcoming the phase transformation problem was proposed in U.S. Pat. No. 3,624,622 by D. Chen. A quenched high temperature phase magnetic film rather than a normal low temperature phase film was used for the memory medium in a Curie point type optical memory. While the use of a quenched phase film is very advantageous because the film has a substantially lower Curie temperature than normal phase films, there are some disadvantages. The most important disadvantage is the stability of the film. Quenched phase MnBi transforms back to the normal phase in about one to two years at room temperature. While considerable improvement in the lifetime of the quenched phase film has been achieved by doping the MnBi with foreign atoms such as titanium, the quenched phase in MnBi has not been completely stabilized. Still another factor favoring normal phase MnBi is the larger Magneto-optic rotation from normal phase films.

It has been discovered that thermomagnetic writing of information on MnBi can be achieved at temperatures near but below the Curie temperature. This technique is described in a copending patent application, Ser. No. 285,798 by D. Chen entitled "Thermoremanent Writing in MnBi Films". Thermoremanent writing at temperatures below the normal phase Curie point significantly reduces the possibility of a crystallographic phase change. The disadvantage of the technique is the precise control of laser power which is required to heat a bit very near but below the normal phase Curie temperature. This necessitates additional system complexity.

The phase transformation problem may also be minimized by writing on MnBi with laser pulses of extremely short duration. This technique was described by Enrique Bernal G. and D. Chen in U.S. Pat. application, Ser. No. 291,448 entitled "Optical Mass Memory". This technique appears to be very advantageous since it minimizes the phase transformation problem and presents a possibility for very high speed operation of the memory. The generation and control of laser pulses of very short duration does, however, lead to additional system complexity.

Two other ideas compensate for the phase transformation problem rather than attempt to eliminate it. The first technique, described in U.S. Pat. No. 3,705,395 by R. L. Aagard and F. M. Schmit, involves adjusting the magneto-optic readout system to compensate for the change in the magneto-optic effect when the film changes from the normal to the quenched phase. This technique has the disadvantage, however, of reducing the readout signal-to-noise ratio.

The other technique is described in U.S. Pat. No. 3,720,923 by D. Chen and J. D. Zook. In this technique a reference bit is stored with one or more information bits. The reference bit is Curie point written approximately the same number of times as the information bit. The reference bit therefore changes from the normal to the quenched phase at about the same rate as each of the information bits. Readout is achieved on a differential basis by comparing the magneto-optic signal from the reference bit with the magneto-optic signal from each of the information bits. Although the absolute value of each of the magneto-optic signals is changing, the difference between the signals remains approximately constant. While this differential storage and readout technique does compensate for the phase transformation problem, the presence of reference bits reduces the total storage density of the memory.

It can be seen that each of the previously proposed techniques has advantages and some drawbacks. For this reason, continued research and engineering efforts have been expended to find other solutions to the phase transformation problem. The desired technique should eliminate or minimize the signal level variations due to the crystallographic phase change without reducing the readout signal-to-noise ratio and without significantly adding to the complexity of the optical memory system.

SUMMARY OF THE INVENTION

In the present invention, information is recorded and read out from a magnetic film having two or more temperature dependent crystallographic phases. The readout signal level variation due to crystallographic phase change is greatly reduced or eliminated. In addition, the readout signal-to-noise ratio is improved.

Information is stored on the film by the conventional Curie point writing process. Selected regions of the film are heated to a temperature above the Curie temperature of the desired crystallographic phase so that upon cooling below the Curie temperature, the selected region has a magnetization direction determined by a net magnetic field present at the location of the selected region.

The improvement of the present invention which minimizes the phase transformation problem and improves readout signal-to-noise ratio is achieved during magneto-optic readout. A readout light beam is directed to a selected region. The readout light beam has an intensity sufficient to temporarily heat the region to a temperature at which at least a portion of the undesired crystallographic phases in the region is removed. The intensity of the light beam is not sufficient, however, to heat the region to a temperature above the Curie temperature of the desired crystallographic phase.

DETAILED DESCRIPTION OF THE PREFERRED EMBODIMENTS

MnBi film has a low temperature or normal phase which is ferromagnetic. This normal phase has a nickel arsenide type crystallographic structure of orthorhombic symmetry. When MnBi is heated above the normal phase Curie temperature of about 360°C, it undergoes a phase transformation into a high temperature phase which is paramagnetic with monoclinic crystallographic symmetry. If a MnBi film is heated above 360°C and then rapidly cooled the high temperature phase is retained at room temperature. This rapid cooling or quenching action can occur during writing or erasing of bits on a MnBi film. With repeated writing-erase cycles, the bit will gradually transform from the normal phase to the quenched phase. Since the magneto-optic effect from quenched phase MnBi is less than the magneto-optic effect from normal phase MnBi, readout signal levels tend to shift with repeated write-erase cycles.

Figure 1:
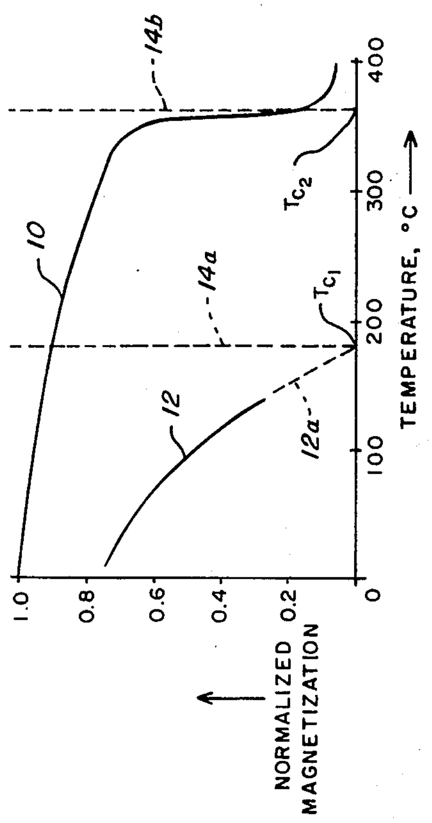
FIG. 1 is a normalized graph of temperature versus magnetization for both low temperature phase and quenched high temperature phase manganese bismuth film.

FIG. 1 illustrates the magnetic properties of MnBi. Curve 10 represents the magnetization of normal phase MnBi and curve 12 represents the magnetization of quenched phase MNBi as a function of temperature. Curves 10 and 12 were drawn using data points obtained experimentally by static or quasi-static measurements. By extrapolation of curve 12, as illustrated by dashed line 12*a*, it can be seen that the Curie temperature ($T_{C1}$) of the quenched phase MnBi is in the neighborhood of 180°C. From curve 10 it can be seen that the Curie temperature ($T_{C2}$) of normal phase MnBi is in the neighborhood of 360°C.

In the static case, MnBi has only one crystallographic phase, the normal phase, in the temperature range between dashed lines 14*a* and 14*b*. Extremes of this temperature range are defined by the quenched phase Curie point of about 180°C and the normal phase Curie point of about 360°C. The system proposed in U.S. Pat. No. 3,631,415 by R. L. Aagard, Di Chen, and F. M. Schmit, proposes operation in this region so that the quenched phase can never appear. When a bit is heated over 360°C and then allowed to cool rapidly only to a temperature above 180°C, the quenched phase does not appear. As discussed previously, continuous operation of the memory at such high temperatures presents several disadvantages.

Unlike the technique suggested in U.S. Pat. No. 3,631,415, the technique of the present invention allows the bit to cool rapidly to room temperature. Thus some quenched phase MnBi will be created within the bit during each write and erase cycle. The important improvement of the present invention is to anneal out all or a substantial portion of the quenched phase material within the bit during the magneto-optic readout of the bit. This is achieved by a readout light beam which has an intensity sufficient to temporarily heat the bit to a temperature at which at least a portion of the quenched phase is removed by transformation back to the normal phase. The readout light beam does not have sufficient intensity to heat the bit to a temperature above the normal phase Curie temperature. In other words, the readout beam temporarily heats the bit to a temperature over about 180°C but less than about 360°C.

The present invention has several advantages. First, it minimizes or eliminates the problem of signal level changes as a result of the phase transformation in MnBi without any additional equipment or system complexity. Second, the memory medium remains at room temperature throughout the operation of the memory. Third, the use of a high intensity readout beam improves the readout signal-to-noise ratio. Prior art systems typically used a readout light beam which caused no significant heating of the bit during readout. The higher readout beam intensity used in the present invention results in larger readout signals and a higher signal-to-noise ratio.

Figure 2:
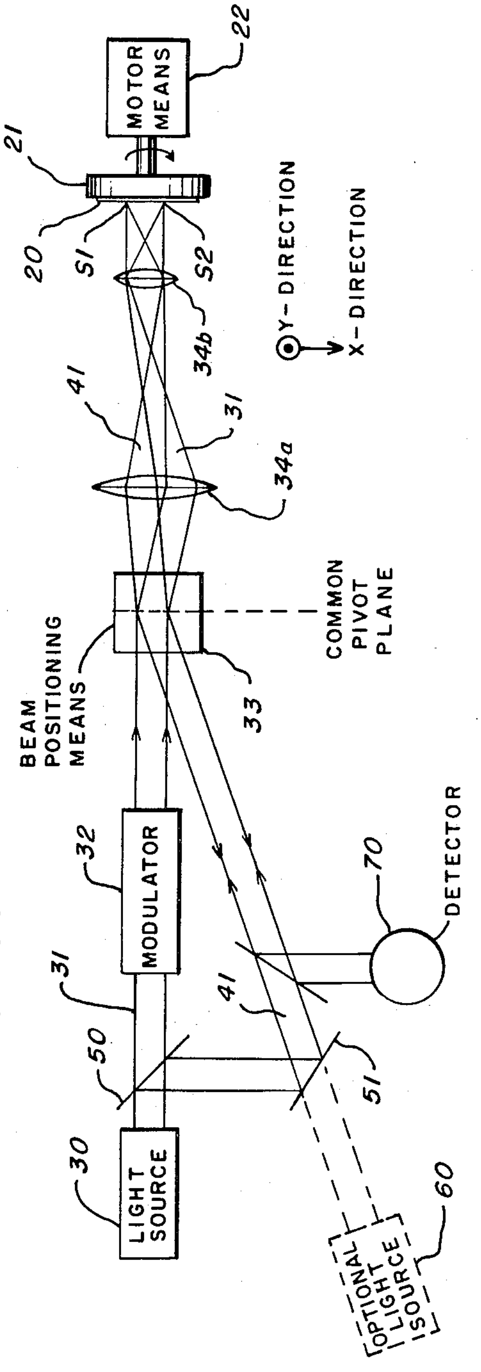
FIG. 2 is a diagrammatical illustration of a preferred optical memory system utilizing the present invention.

FIG. 2 schematically shows an optical mass memory utilizing Curie point writing. The memory includes a mangetic film 20 which has a plurality of temperature dependent crystallographic phases. In particular, the magnetic film 20 may be MnBi having a normal phase and a quenched high temperature phase. This system is generally similar to the memory system described in U.S. Pat. No. 3,715,740 by F. M. Schmit.

Magnetic medium 20 is positioned on rotatable member 21 which is rotated by motor means 22. Rotatable member 21 may be, for example, a disk or a drum.

Light source 30 provides a writing light beam 31 having an intensity sufficient to heat a region of ferromagnetic medium 20 to a temperature above the normal phase Curie temperature. Modulator 32 is positioned in the path of write beam 31 between light source 30 and ferromagnetic medium 20. Light beam positioning means 33 positions write beam 31 in a direction essentially orthogonal to the direction of motion of magnetic medium 20. For reference purposes, the direction of motion of magnetic medium 20 is hereafter referred to as the *x* direction and the direction in which write beam 31 is positioned by light beam positioning means 33 is referred to as the *y* direction. Focusing means, which comprises first and second lenses 34*a* and 34*b*, focuses write beam 31 to a first focused light spot S1 on magnetic medium 20.

Modulator 32 is designed to control the intensity of write beam 31. At a first extreme, modulator 32 allows the maximum intensity of write beam 31 to be transmitted to magnetic medium 20. The maximum beam intensity is sufficient to heat the region to a temperature above the Curie temperature. At a second extreme, modulator 32 attenuates write beam 31, and the beam intensity reaching the region of magnetic medium 20 is not sufficient to raise its temperature to the Curie temperature. Curie point writing is achieved when modulator 32 selectively allows write beam 31 to attain an intensity sufficient to heat a region to a temperature above the Curie temperature. Modulator 32 then attenuates write beam 31 to an intensity insufficient to heat the region above the Curie temperature, such that the region cools to a temperature below the Curie temperature. The magnetization direction of the region upon cooling is determined by the net magnetic fiedl present at the location of the region. The net magnetic field may be due solely to the magnetic field of the magnetic material surrounding the region, or may be due to the magnetic field from the surrounding region plus an external magnetic field applied by a coil (not shown). When modulator 32 remains at the second extreme, it allows the magnetization direction of the region to remain unchanged.

As described previously, the rapid cooling of the Curie point written region immediately after writing causes portions of the region to transform to the quenched high temperature phase. In the present invention, the quenched material is retransformed to the normal phase during magneto-optic readout.

In the system of FIG. 2, a separate readout beam 41 is used for magneto-optic readout. Readout beam 41 may be generated by splitting off a portion of write beam 31. This is achieved by beam splitter 50. Mirror 51 directs read beam 41 toward magnetic medium 20.

Read beam 41 may also be generated by a separate light source, which is shown in phantom in FIG. 2. When light source 60 is used, beam splitter 50 and mirror 51 are unnecessary.

Read beam 41 and write beam 31 are angularly separated in the *x* direction. They have a common pivot plane which is located between light source 30 and magnetic medium 20. Light beam positioning means 33 is located at the common pivot plane such that both beams are equally deflected in the *y* direction.

Read beam 41 also shares focusing lenses 17*a* and 17*b* with read beam 31. Read beam 41 is focused to a second focused light spot S2 which is spatially separated from light spot S1 in the *x* direction. A region of magnetic medium 20 thus passes first through S1 and then through S2.

Detector 70 monitors the magneto-optic rotation caused by the region illuminated at S2. In the system shown in FIG. 2, the Kerr magneto-optic effect is monitored by detector 22. It can be seen, however, that the Faraday magneto-optic effect, which utilizes light transmitted by magnetic medium 20 rather than light which has been reflected, may also be used.

In the present invention, read beam 41 has an intensity which is sufficient to temporarily heat the region at S2 to a temperature at which at least a portion of the quenched phase is removed by transformation back to the normal phase. The intensity of read beam 41 at S2, however, is insufficient to heat the region to a temperature above the normal phase Curie temperature. In other words, in addition to reading out the magnetization direction of the region, read beam 41 temporarily heats the region to a temperature sufficient to anneal out all or part of the quenched phase material which was generated during Curie point writing with write beam 31.

Although the present invention may also be utilized in a system using a common beam for both reading and writing, the system shown in FIG. 2 has the additional advantage of allowing a separate readout beam to be used for checking written bits within fractions of microseconds after storage to insure that the magnetization direction of the bit was properly stored. This feature was described in U.S. Pat. No. 3,715,740.

While this invention has been particularly shown and described with reference to preferred embodiments, it will be understood by those skilled in the art that changes in form and detail may be made without departing from the scope and spirit of the invention. For example, the present invention may be utilized in an optical memory system using a single beam for both reading and writing as well as a system having separate read and write beams.

The embodiments of the invention in which an exclusive property or right is claimed are defined as follows:

1. In an optical memory of the Curie point writing type wherein information is stored on a magnetic film having a plurality of temperature dependent crystallographic phases, a method of recording and reading out information while minimizing readout signal variation due to phase transformation, the method comprising:

heating selected regions of the magnetic film to a temperature above the Curie temperature of a desired crystallographic phase so that upon cooling below the Curie temperature the region has a magnetization direction determined by a net magnetic field present at the location of the selected region; and magneto-optically detecting the magnetization direction of a region by directing a light beam on the region, the light beam having an intensity sufficient to temporarily heat the region to a temperature at which at least a portion of the crystallographic phases other than the desired crystallographic phase in the region is removed, but insufficient to heat the region to a temperature above the Curie temperature of the desired crystallographic phase.

2. The method of claim 1 wherein the magnetic film is manganese bismuth.

3. The method of claim 2 wherein the light beam has an intensity sufficient to temporarily heat a region to a temperature above about 180°C but less than about 360°C.

4. An optical memory of the Curie point writing type wherein formation is stored on a magnetic film having a plurality of temperature dependent crystallographic phases and being characterized by greatly reduced readout signal variation due to crystallographic phase changes, the optical memory comprising:

motor means for providing motion of the magnetic film in a first direction;

first light source means for producing a write light beam having an intensity sufficient to heat a region of the magnetic medium to a temperature above the Curie temperature of a desired crystallographic phase;

second light source means for producing a read light beam angularly separated from the write light beam in the first direction and having an intensity sufficient to temporarily heat a region of the magnetic film to a temperature at which at least a portion of the crystallographic phases other than the desired crystallographic phase in the region is removed, but insufficient to heat the region to a temperature above the Curie temperature of the desired crystallographic phase, the write and read light beams having a common pivot plane located between the first and second light source means and the magnetic medium;

light beam positioning means positioned at the common pivot plane for positioning the write and read light beams in a second direction essentially orthogonal to the first direction;

focusing means for focusing the write and read light beams to a write and a read focused light spot respectively on the magnetic film, the read focused light spot being spatially separated in the first direction from the write focused light spot;

modulator means for selectively transmitting the write light beam with an intensity sufficient to heat a region of the magnetic film to a temperature above the Curie temperature, and then attenuating the write light beam to an intensity insufficient to heat the region to a temperature above the Curie temperature, such that the region cools to a temperature below the Curie temperature and has a magnetization direction determined by a net magnetic field present at the location of the region; and detector means for receiving the read light beam from the region and for producing a magneto-optic signal indicative of the magnetization direction of the region.

5. The optical memory of claim 4 wherein the magnetic film is manganese bismuth.

6. The optical memory of claim 5 wherein the read light beam has an intensity sufficient to temporarily heat a region to a temperature above about 180°C but less than about 360°C.

7. The optical memory of claim 4 wherein the second light source means comprises:

beam splitter means positioned in the path of the write light beam to split off a portion of the write light beam, thereby forming the read light beam; and mirror means for directing the read light beam toward the magnetic film.

* * * * *